United States Patent
Gottlieb

(10) Patent No.: US 8,121,588 B2
(45) Date of Patent: Feb. 21, 2012

(54) VOICE-EXTENDING EMERGENCY RESPONSE SYSTEM

(75) Inventor: Mark Gottlieb, Fairfax Station, VA (US)

(73) Assignee: Logicmark, LLC, Buffalo Grove, IL (US)

( * ) Notice: Subject to any disclaimer, the term of this patent is extended or adjusted under 35 U.S.C. 154(b) by 548 days.

(21) Appl. No.: 12/230,841

(22) Filed: Sep. 5, 2008

(65) Prior Publication Data

US 2009/0068978 A1    Mar. 12, 2009

Related U.S. Application Data

(60) Provisional application No. 60/935,894, filed on Sep. 5, 2007.

(51) Int. Cl.
*H04M 3/00* (2006.01)

(52) U.S. Cl. .......... 455/420; 455/404.1; 455/404.2; 379/37; 340/291; 340/306; 340/293; 340/287

(58) Field of Classification Search ........... 455/404.1, 455/420, 404.2; 340/291, 306, 293, 287; 379/37
See application file for complete search history.

(56) References Cited

U.S. PATENT DOCUMENTS

| | | | | |
|---|---|---|---|---|
| 4,219,698 | A * | 8/1980 | Birilli et al. | 379/37 |
| 4,446,654 | A * | 5/1984 | Schoolman et al. | 49/181 |
| 2001/0017912 | A1 * | 8/2001 | Baum et al. | 379/37 |
| 2002/0075815 | A1 * | 6/2002 | Sharma et al. | 370/276 |
| 2002/0154743 | A1 * | 10/2002 | Dawson | 379/37 |
| 2003/0027547 | A1 * | 2/2003 | Wade | 455/404 |
| 2006/0073806 | A1 * | 4/2006 | Jenkins | 455/404.1 |

* cited by examiner

*Primary Examiner* — Nick Corsaro
*Assistant Examiner* — Quan Hua
(74) *Attorney, Agent, or Firm* — Davidson Berquist Jackson & Gowdey LLP

(57) ABSTRACT

A system for providing emergency services in which a voice pendant provides voice signals to a corresponding radio-based voice-enabled base station which either (1) acoustically forwards the voice signals on to an existing base station or (2) forwards the voice signals on to an existing base station via a communications link. The existing base station is triggered by a triggering signal that is learned by the radio-based voice-enabled base station by either DTMF programming or by receiving the triggering signal from an existing pendant while in a learning mode.

34 Claims, 5 Drawing Sheets

VOICE-EXTENDING EMERGENCY RESPONSE SYSTEM

CROSS-REFERENCE TO CO-PENDING APPLICATIONS

The present invention is related to and claims priority to co-pending provisional U.S. Patent Application Ser. No. 60/935,894, filed Sep. 5, 2007. The present invention is also related to co-pending U.S. patent application Ser. No. 11/517,320, filed Sep. 8, 2006. The entire contents of those applications are incorporated herein by reference.

FIELD OF INVENTION

The present invention is directed to the field of emergency response systems, and in one embodiment to a system that includes an emergency pendant that communicates voice signals with a first base station connected to a second base station such that the first base station can signal the second base station when the emergency pendant has been activated.

DISCUSSION OF THE BACKGROUND

The Personal Emergency Response System (PERS) market has been around for more than 20 years. Many systems, potentially more than one million, on the market today are similar to the system of FIG. 1. In such a system 100, a pendant 110 is worn by a user. (As used herein, a "pendant" should be considered to be any small communications device designed to be worn on a person's body or around a person's neck, such as on a necklace or in a watch). The pendant 110 communicates with a base station 150 via radio waves 180. The base station 150 plugs into the wall power jack for power and into the telephone line jack for communication to a private central monitoring station or another emergency response center (e.g., the 911 emergency operator).

When the button 120 on the pendant 110 is pushed, the base station 150 makes the connection to the emergency response center—and a two way voice communication can be carried on through the base station which has a full speakerphone 160 as part of the base station 150. This is quite effective and allows for the monitoring station to understand the nature of the issue and thus to contact the appropriate authorities for help. The base station 150 may further be coupled to one or more electronic sensors 170 (e.g., a smoke detector, a carbon monoxide detector and/or a panic button as one might have in a bathroom or shower) to provide additional information to the private central monitoring station or the emergency response center.

For a small one bedroom apartment the speakerphone 160 of the base station 150 is adequate to send and receive voice throughout the apartment. However, as the area to be covered increases (e.g., in a large 3 story home), the value of the speakerphone in the base station diminishes quickly. If a person in need of help is in the upstairs bathroom and the base station in the downstairs kitchen is triggered to call the monitoring station then the acoustical voice communication is nonexistent for all practical purposes.

In the recent years a few systems have come on the market with a speakerphone voice system located in the pendant which is carried around by the user. This then allows full two-way voice communication with the emergency response station to be carried out anywhere in and around the home—as long as the communications signal of the pendant to base station is adequate. One such system is described in U.S. Pat. No. 7,231,200, incorporated herein by reference.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
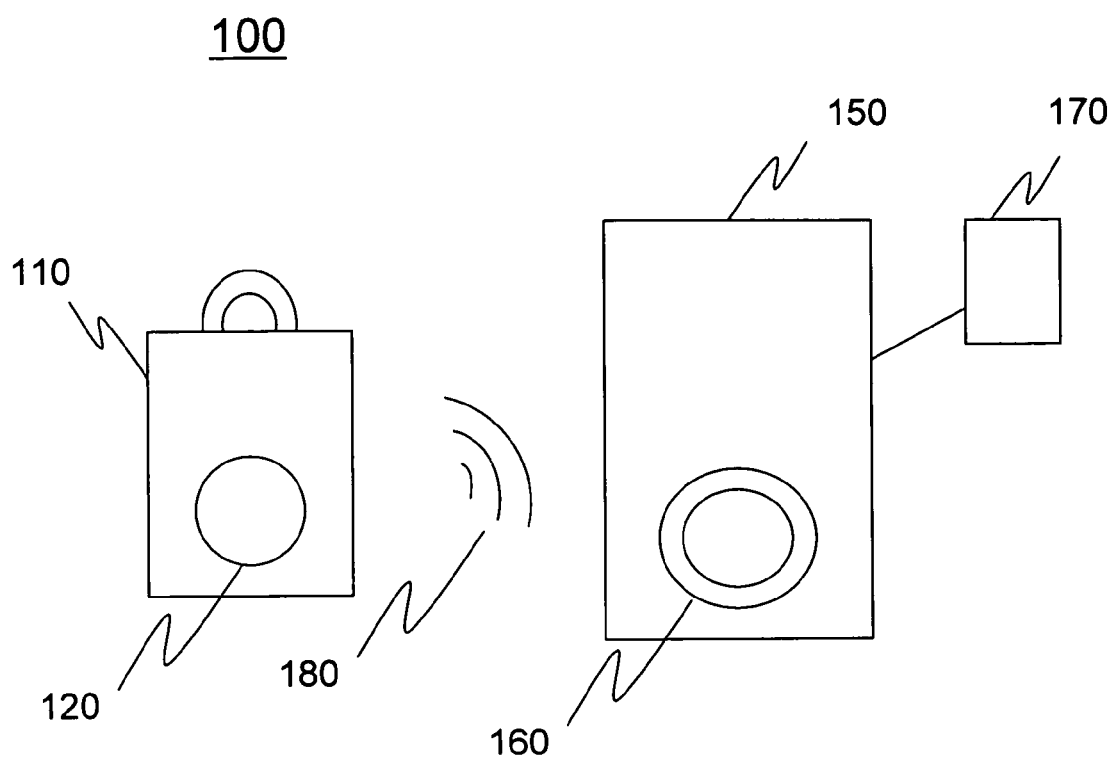
FIG. 1 is a block diagram of a known emergency response system that is connected to at least one external sensor (e.g., a smoke detector) but for which voice signals do not pass through the pendant.
Figure 2:
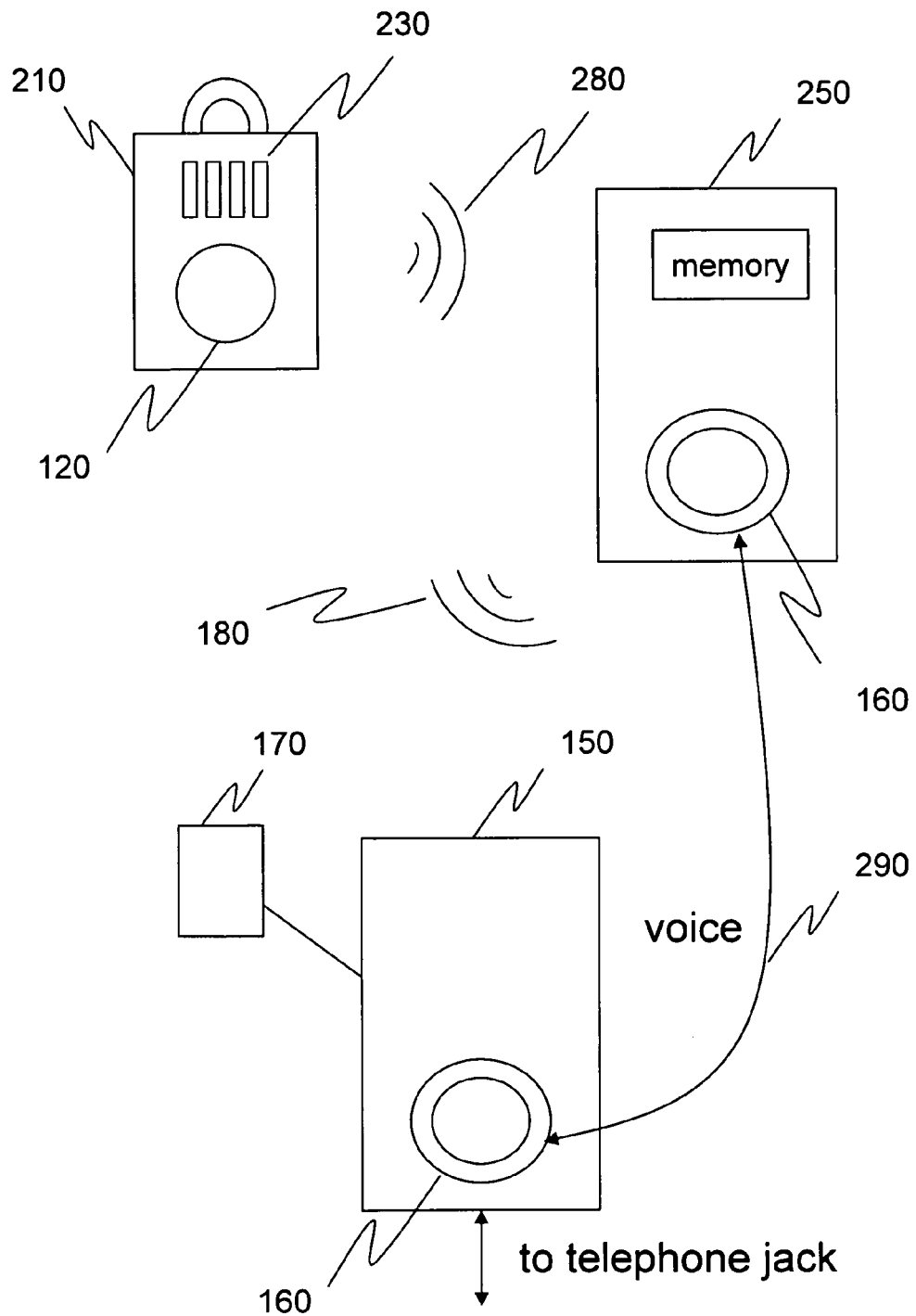
FIG. 2 is a block diagram of a first embodiment of a system for providing emergency services in which a voice pendant provides voice signals to a corresponding radio-based voice-enabled base station which acoustically forwards the voice signals on to an existing base station.

Turning to FIG. 2, a new radio-based voice-enabled (RBVE) base station 250 provides bi-directional communications 280 (either half-duplex or full-duplex) with an emergency pendant 210 that includes an emergency button 120 and a speakerphone 230. The pendant 210 acoustically receives voice signals from a user and sends those voice signals via radio signals to the RBVE base station 250. Similarly, the pendant receives radio-based voice signals from the RVBE base station 250 and acoustically plays them out of the speakerphone 230 to the user. The RBVE base station 250 then utilizes its own speakerphone 160 to acoustically send voice signals 290 to the base station 150 and receive voice signals from the base station 150. By placing the two base stations 250 and 150 in close proximity to each other, the system 200 can exchange voice signals between the user and the base station 150 even when the user is out of acoustic voice range (e.g., downstairs when the base station 150 is upstairs or vice versa). In such a configuration, the base station 150 is able to pass on to the monitoring service (e.g., a private central monitoring station or the emergency response center) voice communication with the user (through the pendant 210) and information from any of the traditional sensors 170.

To facilitate the base station 150 responding to the pendant 210, the base station 250 is configured to "learn" the RF transmission of the original pendant 110 during initial set up and configuration of the base station 250. The base station 250 can be put into a learning mode by any number of methods. For example, the base station 250 may include a switch (e.g., underneath, on the side or on top of the base station) that the user pushes (or pushes and holds) to start and/or end the learning mode. Alternatively, the base station 250 may be connected to a telephone handset and a series of buttons pushed to start the learning mode (e.g., "##") and/or end the learning mode (e.g., "**").

While the base station 250 is in the learning mode, the button 120 of the pendant 110 is pushed (or pushed and held) to cause the pendant 110 to emit its triggering signal 180. The triggering signal is typically the transmission of a unique pendant ID or other unique message from the pendant 110 to the base station 150 such that the pendant 110 can be distinguished from other pendants (e.g., a neighbor's pendant). (Preferably the base station 150 is disconnected from the phone system prior to triggering the pendant 110 so that a false alarm is avoided.) If the base station 250 has already been associated with a new pendant 210 and is only capable of learning a single pendant's triggering signal, then the new pendant 210 need not be activated during the learning mode. (The learning of multiple triggering signals is discussed in greater detail below.)

In one embodiment, the base station 250 is designed to monitor a single frequency (e.g., 315 MHz) for the triggering signal 180. However, in an alternate embodiment, the ability to monitor multiple frequencies is provided in order to achieve greater compatibility with existing base stations. In one embodiment, a multi-position switch on the base station 250 (e.g., underneath or on the back) identifies to the base station which frequency of multiple frequencies should be monitored. For example, the multi-position switch may include various frequencies (e.g., in the range of 300 to 450 Mhz). By setting the switch to one of 'n' positions the base station can be configured to listen to pendants 110 from a number of different manufacturers. For example, manufacturer A would be position 1, manufacturers B, C and D would be position 2 and all others position 3. This would let the base station 250 know which type of pendant is to be learned and would allow the proper frequency band (and even encoding algorithm, timing, etc.) to be used in reading the triggering signal and in the later transmissions of the triggering signal. Alternatively, the "switch" may be a DTMF tone decoder which detects a key (or sequence of keys) that identifies the appropriate manufacturer. For example, "##" identifies the start of learning using a default setting, but "#1#" identifies the start of learning for a different set of manufacturers. Similarly, "#2#" would identify yet another set.

Alternatively, the base station may monitor several frequencies during the learning process to automatically detect which frequency (and other settings) to use. The base station can then determine the manufacturer (or the class of manufacturers) from the frequency and/or the encoding formats and configure itself to replay the triggering signal using the correct parameters.

Later, when the button 120 of the voice pendant 210 is activated, the pendant 210 emits an activation signal (which is part of the communications 280) to the base station 250, and the base station 250 then emits from an internal transmitter the triggering signal 180 that it learned while in the learning mode. This causes the base station 150 to dial out to the emergency response center as it would have done had the original pendant 110 been activated. Using this learning technique, the base station 250 and the voice pendant 210 do not need to know any of the communications protocol handshaking that is being used with the emergency monitoring service since the base station 150 already knows and controls that.

In one embodiment of FIG. 2, the base stations 150 and 250 share a power adapter that splits power between the two base stations. In an alternate embodiment, each base station 150 and 250 has its own power adapter. The base station 250 may alternatively be plugged into AC power and contain a receptacle for receiving the power cord of the base station 150 (or for outputting DC power to the base station 150). In an embodiment where the base station 250 includes a battery backup, power (AC or DC) may be supplied from the base station 250 to the base station 150 in the event of a power outage.

Figure 3:
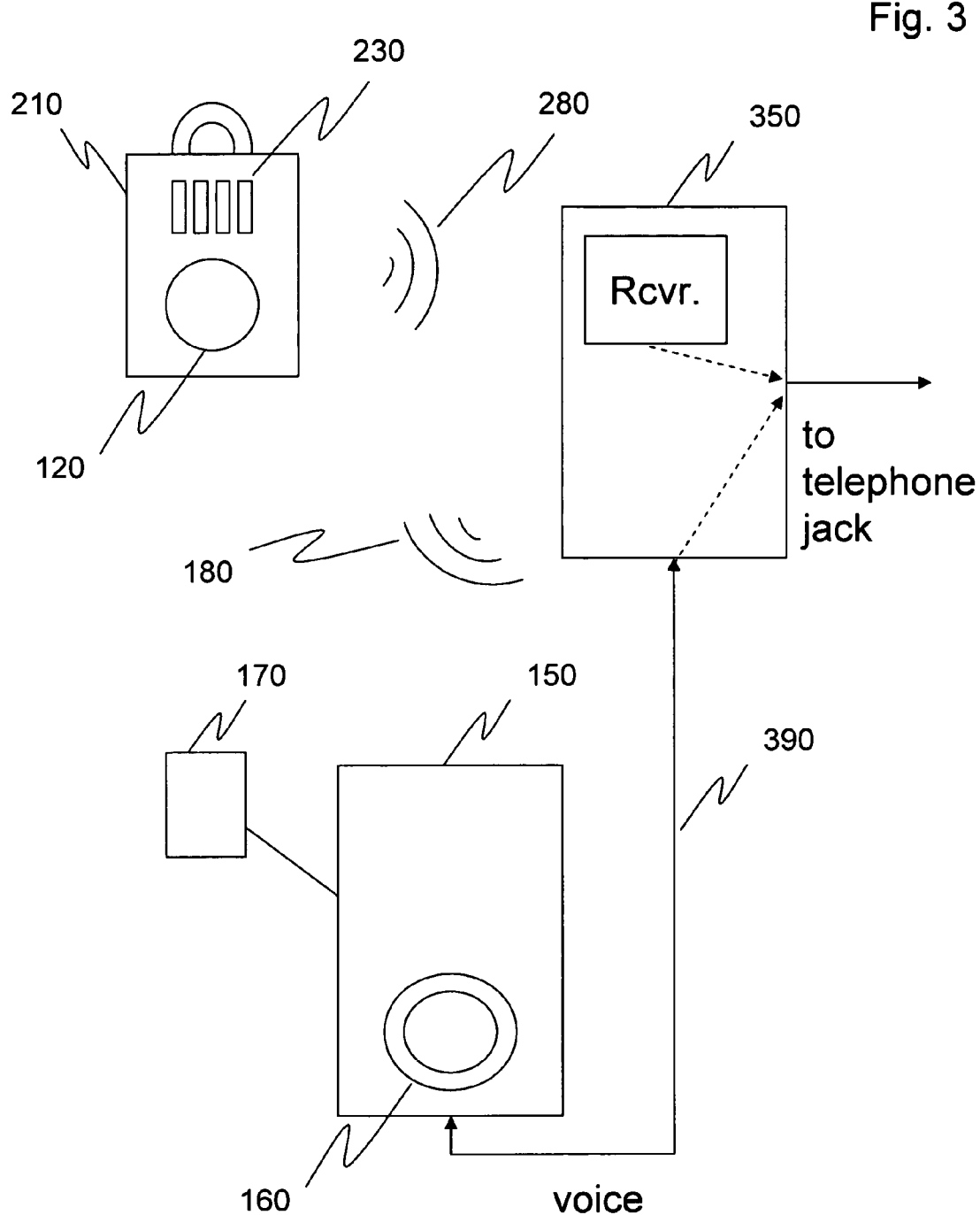
FIG. 3 is a block diagram of a second embodiment of a system for providing emergency services in which a voice pendant provides voice signals to a corresponding radio-based voice-enabled base station which forwards the voice signals on to an existing base station via a communications link.

In an alternate embodiment shown in FIG. 3, the base station 250 of FIG. 2 is replaced by an alternate base station 350 that does not need a speakerphone. Instead, the base station 350 communicates its voice signals directly to the monitoring service via the telephone jack. Voice signals from the pendant 210 are transmitted to the base station 350 where they are then transmitted to the telephone jack and out to the emergency monitoring service. Voice signals received from the emergency monitoring service are then broadcast from the base station 350 to the pendant 210. To cancel out additional noise from the speakerphone 160, the base station 350 may suppress the signal received from the base station 150 until after the call to the emergency monitoring service has been established. The base station 150 is still able to seize the telephone line via the telephone connection 390 of the base station 150 (e.g., which is directly connected to a telephone wall jack or which is connected to a telephone jack on the base 350).

In the configuration of FIG. 3, when the pendant 210 is triggered, the base station 350 establishes a connection to the base station 150 over the telephone connector 390 such that the base station 150 can seize the telephone line to make the outgoing call. Alternatively, the base station 350 may establish a connection to the base station 150 over the telephone connector 390 and simply seize the line itself around the time (e.g., just before or just after) that it sends the triggering signal to the base station 150. When the base station 150 tries to seize the line, the line will already be active, but the base station 150 will continue as long as the dial tone is present.

While the embodiment of FIG. 3 is shown with the base stations 150 and 350 connected in series, the base stations 150 and 350 can instead be connected in parallel (e.g., to separate telephone jacks or sharing via a "Y" splitter).

In the configurations of FIGS. 2 and 3, there is the possibility that the pendant 210 will be close enough to the original base station 150 during a call that the pendant and speakerphone 160 of the base station 150 will both be picking up voice signals from the wearer of the pendant 210. In such a case, there may be feedback, delay or other distortion which makes it difficult for the private central monitoring station or the emergency response center to hear and/or understand what is being said and/or be heard by the wearer of the pendant 210. To address this issue, the base station (250 in FIGS. 2 and 350 in FIG. 3) may be altered to monitor the feedback, delay or other distortion.

In one embodiment, a base station 250 may monitor the signal coming into the speakerphone 160 of the base station 250 to determine if it is receiving the same signal from the pendant 210 and the speakerphone 160 of the base station 250. If so, and if the voice signal received at the speakerphone 160 of the base station 250 is of sufficient strength to be heard by the base station 150 without the use of the speakerphone 160 of the base station 250, the base station 250 may stop transmitting via its speakerphone 160 the voice signals received from the pendant 210. Should the voice signals received at the speakerphone 160 of the base station 250 stop being of sufficient strength to be heard by the base station 150 without the use of the speakerphone 160 of the base station 250, then the base station 250 could again begin outputting the voice signals received from the pendant 210.

In another embodiment, a base station 350 may be configured to include a microphone and to monitor the signal coming into the microphone to determine if it is receiving the same signal from the microphone and the pendant 210. If so, and if the signal received at the microphone is of sufficient strength to be heard by the base station 150 without transmitting the voice signals from the pendant 210 to the telephone jack, the base station 350 may stop transmitting the voice signals received from the pendant 210 to the telephone jack. Should the voice signals received at the microphone stop being of sufficient strength to be heard by the base station 150, then the base station 350 could again begin outputting the voice signals received from the pendant 210 to the telephone jack.

In yet a further embodiment, a base station 350 may be configured to include a microphone and to monitor the signal coming into the microphone to determine if it is receiving the same signal from the microphone and the pendant 210. If so, the base station 350 may block the voice signals that it is receiving from the original base station 150 from being transmitted to the telephone line. Should the voice signals received at the microphone stop being of sufficient strength to be heard by the base station 150, then the base station 350 could again begin outputting the voice signals received from the original base station 150 to the telephone jack.

In yet another embodiment, the base station 250 could be configured to include echo cancellation and distortion from the two sources, as it done in speakerphone systems with multiple microphones.

In addition to the ability to call out to a private central monitoring station or another emergency response center, the system described above can likewise be used to receive calls. When an incoming call is detected by the base station 350, the base station 350 can detect whether button of the pendant 210 is activated by the user. If so, the base station 350 can seize the line and then use the pendant 210 as a small cordless phone (albeit with no dial pad). However, as discussed above, if no incoming call is detected when the button is activated, then the private central monitoring station or another emergency response center is called.

The base station 350 may further monitor the telephone line (e.g., monitor its impedance) to determine if another extension is picked up such that the pendant can stop transmitting. This will extend the battery life of the pendant. Furthermore, while the pendant is in the phone answer mode the pendant may be shut off by pushing the button again (e.g., when another extension is picked up but without requiring line monitoring).

Figure 4:
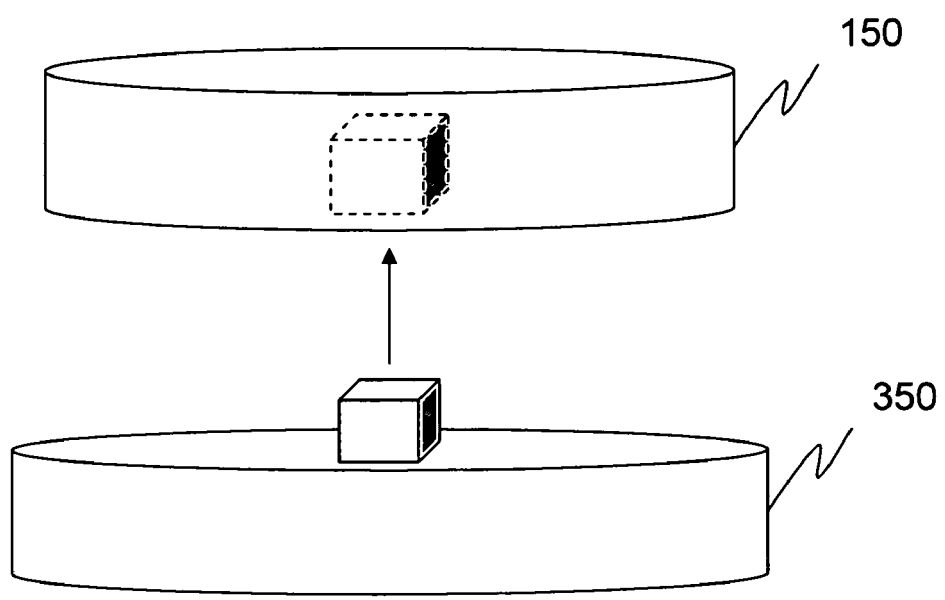
FIG. 4 is a conceptual diagram of a first base station physically interconnecting with a second base station.

The telephone connection 390 between the base stations 150 and 350 is illustrated as a simple telephone cord (e.g., a standard 4-wire RJ-11 telephone cord that goes between an analog telephone and a wall jack). Alternatively, depending on the location of the jack in the base station 150, the base station 350 may be made to fit integrally around the body of the base station 150. For example, as shown in FIG. 4, if the telephone jack of the base station 150 is on the bottom of the base station 150, the base station 350 may include a connector on the upper portion that connects with the jack on the bottom of the base station 150. The base station 350 may further include a release mechanism for allowing the connector of the base station 350 to disengage from the jack the bottom of the base station 150. As described above, a power cord splitter may be used to power the two base stations, or the base station 350 may include a power jack and/or a short connector for connecting power to the base station 150. In embodiments of the base station 150 that include two jacks (e.g., one for connecting to a telephone system jack and one for connecting to an optional external phone), the base station 350 may include two connectors that mate with the connectors of the base station 150 such that all the features of the base station 150 can be provided through the base station 350. For example, the base station 350 may include a jack for receiving a telephone connection from an optional external phone or handset that connects to the second jack of the base station 150.

In addition to learning the transmission signal of a single pendant 110, base stations 250 and 350 can be programmed to learn as many triggering signals 180 as can be stored in the base station 250 or 350 (e.g., in digital form in its memory). Each of those triggering signals can be associated with a new pendant 210 by activating the new pendant 210 during the learning process. For example, after entering the learning mode (e.g., using "##"), the triggering signal 180 of a pendant 110 is learned, and then the user presses another key (e.g., "1") and the new pendant 210 is triggered before ending the learning mode (e.g., by pressing ""). The base station 250 or 350 can then associate the new pendant information (e.g., ID) with the learned triggering signal such that the new pendant 210 will cause the appropriate triggering signal 180** to be transmitted.

In one embodiment of the base stations 250 and 350, the base station performs filtering to prioritize which party's voice is given transmission preference over the other. Various filters can be used, such as signal strength or direction of communication. For example, the louder party may get transmission priority. Alternatively, the person speaking on the pendant 210 may always get priority. In yet another embodiment, the priority may be changed dynamically by one of the parties pressing a DTMF key. This may occur when the monitoring service is not being heard because of background noise being picked up by the base station or pendant. The monitoring service may then change its priority so that it can be heard.

Alternatively, the pendant 210 can be configured to store the triggering signals of the original pendant(s) 110 if the pendant is configured with storage. The triggering signals may be uploaded from the base stations 250 or 350 to the pendant, or the pendant may itself enter a learning mode when instructed to do so (e.g., by using a switch on the pendant or base station or by the base station receiving appropriate DTMF tones).

In one embodiment, the base station 250 or 350 can be inductively coupled to the phone line by just placing a pick up sensor/emitter on or around the telephone line anywhere along its length.

In another embodiment in which the base station 250 or 350 is configured to know the transmission characteristics of various brands of pendants 110, the base station can be programmed using DTMF tones with the transmission characteristics of a user's original pendant 110 and the unique identifier of the pendant 110 such that the base station generates the proper triggering signal when the new pendant 210 is used. One advantage of such a programming approach is that the programming can be performed without physical access to the pendant 110 and potentially remotely (e.g., over the phone by a monitoring service when the user is installing a new base station). For example, when a customer connects a new base station to an old base station, the customer then calls his/her existing monitoring service. The monitoring service requests that the customer press (or press and hold) a particular button on the base station which causes the base station to listen on the phone line. The monitoring service then looks up the pendant ID corresponding to the customer's pendant 110, and the monitoring service enters the DTMF codes required to program the base station 250 or 350. For example, the monitoring service enters "#*123*456**" where "#*" identifies DTMF programming, "123" represents a specific manufacturer, "456" represents the pendant ID of the user's pendant, and "**" represents an end of programming.

Alternatively, a monitoring service or installer could preprogram the base station 250 or 350 with the customer's pedant ID prior to shipping the new base station to the customer since the monitoring service already knows the make and model of the existing system and the ID numbers and code numbers of the pendant 110.

Figure 5:
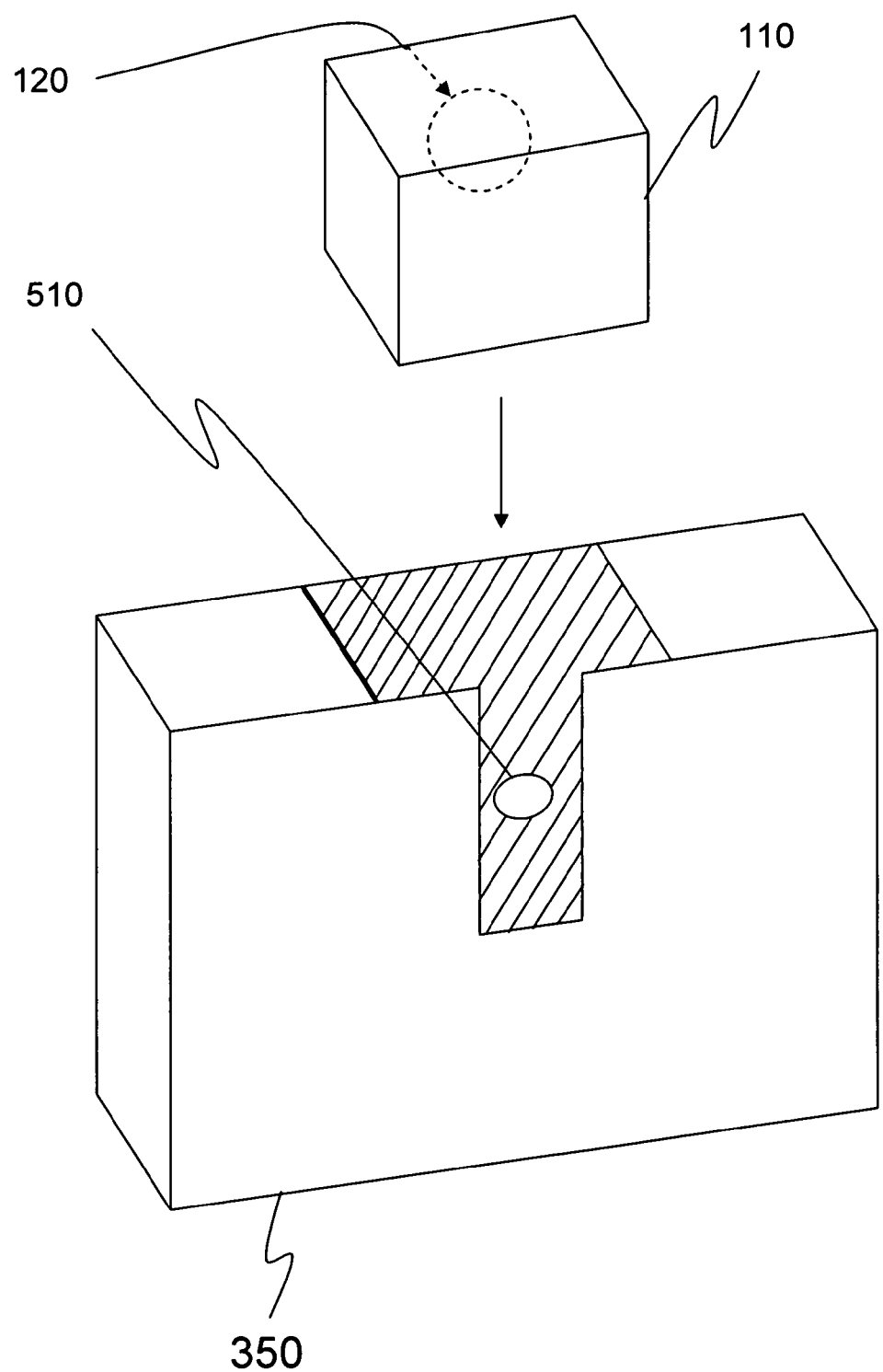
FIG. 5 is a conceptual drawing of a pendant being placed into a base station such that the button of the pendant can be controllably depressed by the base station.

As shown in FIG. 5, in another alternative embodiment, the base station 350 can avoid the learning mode by instead including circuitry and a simple mechanical actuator (e.g., a solenoid) 510 that actually pushes the button 120 on the pendant 110 that would be held by the base station 250 or 350. In the illustrated embodiment, the pendant 110 can be slid into an opening at one edge (e.g., the top) while maintaining an opening on an adjacent edge (e.g., the front) such that the pendant is accessible for removal. In the illustrated embodiment, the (with the button 120 is facing to the rear of the opening, but the actuator could be positioned instead on the sides or the bottom of the opening. Alternatively, the bottom of the opening on the base station can include a spring mechanism that, when the pendant 110 is pushed down during removal, causes the pendant 110 to be pushed up, thereby avoiding the need for an opening on an adjacent edge. The same spring mechanism is pushed down during installation of the pendant 110 (e.g., such that the pendant 110 is flush with an edge of the base station). Alternatively, the pendant may be clipped, strapped, contained within a door or in any other way held in close enough proximity to the actuator 510 to enable the actuator 510 to push the button 120.

While certain configurations of structures have been illustrated for the purposes of presenting the basic structures of the present invention, one of ordinary skill in the art will appreciate that other variations are possible which would still fall within the scope of the appended claims.

The invention claimed is:

1. An emergency dialer base station for controlling an external emergency dialer, the base station comprising:
   circuitry for setting the emergency dialer base station into a learning mode;
   circuitry for receiving, while the emergency dialer base station is set to the learning mode, information corresponding to a triggering signal configured to be received by the external emergency dialer when a button on a non-voice-enabled pendant has been pressed,
   wherein the triggering signal uniquely identifies the non-voice-enabled pendant from other non-voice-enabled pendants;
   a memory for storing an indication of the triggering signal configured to be received by the external emergency dialer while the emergency dialer base station is set to the learning mode;
   a receiver for receiving an activation signal from a voice-enabled pendant;
   a transmitter for transmitting the triggering signal learned while the emergency dialer base station was set to the learning mode to the external emergency dialer in response to receiving the activation signal from the voice-enabled pendant; and
   circuitry for converting voice signals received from the voice-enabled pendant to signals to be received by a remote monitoring service communicating with the external emergency dialer,
   wherein the circuitry for converting voice signals received from the voice-enabled pendant to signals to be received by the remote monitoring service communicating with the external emergency dialer further comprises a speakerphone configured for acoustically transmitting the voice signals received from the voice-enabled pendant to the external emergency dialer.

2. The base station as claimed in claim 1, wherein the circuitry for receiving information corresponding to the triggering signal comprises radio receiving circuitry for receiving the triggering signal from the non-voice-enabled pendant.

3. The emergency dialer base station as claimed in claim 2, further comprising a multi-position switch for identifying a transmission characteristic of the triggering signal.

4. The base station as claimed in claim 1, wherein the circuitry for receiving information corresponding to the triggering signal comprises DTMF tone receiving circuitry for receiving a pendant identifier corresponding to the non-voice-enabled pendant.

5. The base station as claimed in claim 3, wherein the DTMF tone receiving circuitry comprises circuitry for receiving the pendant identifier from the remote monitoring service over a telephone network.

6. The emergency dialer base station as claimed in claim 1, wherein the circuitry for converting voice signals received from the voice-enabled pendant to signals to be received by the remote monitoring service communicating with the external emergency dialer comprises circuitry for detecting that the voice signals received from the voice-enabled pendant are also being received by the speakerphone and for stopping acoustic transmission to the external emergency dialer of the voice signals received from the voice-enabled pendant.

7. The emergency dialer base station as claimed in claim 1, further comprising a switch for detecting that the emergency dialer base station is to learn the triggering signal.

8. The emergency dialer base station as claimed in claim 7, wherein the switch comprises a DTMF detector for identifying a transmission characteristic of the triggering signal.

9. The emergency dialer base station as claimed in claim 7, wherein the switch comprises a modem communications detector for identifying a transmission characteristic of the triggering signal.

10. The emergency dialer base station as claimed in claim 1, further comprising a power connector for providing power to the external emergency dialer.

11. The emergency dialer base station as claimed in claim 1, further comprising a power connector for providing power to the external emergency dialer from a battery backup within the emergency dialer base station.

12. The base station as claimed in claim 1, wherein the circuitry for receiving information corresponding to the triggering signal comprises circuitry for receiving a pendant identifier corresponding to the non-voice-enabled pendant via modem communications.

13. The base station as claimed in claim 1, wherein the memory for storing the indication of the triggering signal configured to be received by the external emergency dialer comprises a memory for storing pairs of a triggering signal and an activation signal and further comprising:
   circuitry for determining which triggering signal of the pairs stored in memory should be transmitted in response to a received activation signal; and
   circuitry for passing the determined triggering signal from the memory to the transmitter for transmitting the triggering signal such that a single base station can emulate plural non-voice-enabled pendants.

14. The base station as claimed in claim 1, wherein the circuitry for receiving information corresponding to the triggering signal comprises radio receiving circuitry for receiving radio signals on plural frequencies and circuitry for determining on which of the plural frequencies the triggering signal is received from the non-voice-enabled pendant.

15. The base station as claimed in claim 1, wherein the circuitry for receiving information corresponding to the triggering signal comprises radio receiving circuitry for receiving radio signals encoded using plural encoding methods and circuitry for determining which of the plural encoding methods encoded the triggering signal received from the non-voice-enabled pendant.

16. The emergency dialer base station as claimed in claim 1, wherein the circuitry for converting voice signals received from the voice-enabled pendant comprises an inductive coupler on an exterior of a telephone line for transmitting the voice signals received from the voice-enabled pendant to the remote monitoring service via the telephone line.

17. The emergency dialer base station as claimed in claim 1, further comprising a microphone, wherein the circuitry for converting voice signals received from the voice-enabled pendant to signals to be received by the remote monitoring service communicating with the external emergency dialer comprises circuitry for detecting that the voice signals received from the voice-enabled pendant are also being received by the microphone and for stopping acoustic transmission to the external emergency dialer of the voice signals received from the voice-enabled pendant.

18. The emergency dialer base station as claimed in claim 1, further comprising a microphone, wherein the circuitry for converting voice signals received from the voice-enabled pendant to signals to be received by the remote monitoring service communicating with the external emergency dialer comprises circuitry for detecting that the voice signals received from the voice-enabled pendant are also being received by the microphone and for blocking transmission of voice signals acoustically received by the external emergency dialer from being transmitted to the remote monitoring service.

19. The emergency dialer base station as claimed in claim 1, wherein the circuitry for converting voice signals received from the voice-enabled pendant to signals to be received by the remote monitoring service communicating with the external emergency dialer comprises circuitry for cancelling at least one of feedback, echo and distortion caused by receiving the voice signals received from the voice-enabled pendant and voice signals from the external emergency dialer.

20. The emergency dialer base station as claimed in claim 1, wherein the triggering signal uniquely identifies the non-voice-enabled pendant from other non-voice-enabled pendants using a pendant ID.

21. An emergency dialing method comprising:
setting the emergency dialer base station into a learning mode;
receiving, while the emergency dialer base station is set to the learning mode, information corresponding to a triggering signal configured to be received by an external emergency dialer when a button on a non-voice-enabled pendant has been pressed,
wherein the triggering signal uniquely identifies the non-voice-enabled pendant from other non-voice-enabled pendants;
storing an indication of the triggering signal configured to be received by the external emergency dialer while the emergency dialer base station is set to the learning mode;
receiving an activation signal from a voice-enabled pendant;
transmitting the triggering signal learned while the emergency dialer base station was set to the learning mode to the external emergency dialer in response to receiving the activation signal from the voice-enabled pendant; and
converting voice signals received from the voice-enabled pendant to signals to be received by a remote monitoring service communicating with the external emergency dialer,
wherein converting voice signals received from the voice-enabled pendant further comprises acoustically transmitting the voice signals received from the voice-enabled pendant to the external emergency dialer via a speakerphone.

22. The method as claimed in claim 21, wherein receiving information corresponding to the triggering signal comprises at least one of (1) receiving the triggering signal from the non-voice-enabled pendant and (2) receiving a pendant identifier corresponding to the non-voice-enabled pendant using DTMF tones.

23. The method as claimed in claim 21, further comprising detecting that the emergency dialer base station is to learn the triggering signal.

24. The method as claimed in claim 21, further comprising identifying a transmission characteristic of the triggering signal.

25. The method as claimed in claim 21, further comprising detecting using DTMF tones that the emergency dialer base station is to learn the triggering signal.

26. The method as claimed in claim 21, further comprising providing power from the base station to the external emergency dialer.

27. The method as claimed in claim 21, further comprising providing power from a battery backup within the base station to the external emergency dialer.

28. The method as claimed in claim 21, wherein receiving information corresponding to the triggering signal comprises receiving a pendant identifier corresponding to the non-voice-enabled pendant via modem communications.

29. The method as claimed in claim 21, further comprising detecting using modem communications that the emergency dialer base station is to learn the triggering signal.

30. The method as claimed in claim 21, wherein receiving information corresponding to the triggering signal comprises receiving a pendant identifier corresponding to the non-voice-enabled pendant from a remote monitoring service using DTMF tones over a telephone network.

31. The method as claimed in claim 21, wherein receiving information corresponding to the triggering signal comprises receiving radio signals on plural frequencies and determining on which of the plural frequencies the triggering signal is received from the non-voice-enabled pendant.

32. The method as claimed in claim 21, wherein receiving information corresponding to the triggering signal comprises receiving radio signals encoded using plural encoding methods and determining which of the plural encoding methods encoded the triggering signal received from the non-voice-enabled pendant.

33. The method as claimed in claim 21, wherein converting voice signals received from the voice-enabled pendant comprises transmitting the voice signals received from the voice-enabled pendant to the remote monitoring service via an inductively coupled telephone line.

34. The emergency dialing method as claimed in claim 21, wherein the triggering signal uniquely identifies the non-voice-enabled pendant from other non-voice-enabled pendants using a pendant ID.

* * * * *